United States Patent [19]
Patterson

[11] 4,014,734
[45] Mar. 29, 1977

[54] TUBE FORMING DEVICE

[75] Inventor: Richard A. Patterson, Woodbury, Minn.

[73] Assignee: Minnesota Mining and Manufacturing Company, St. Paul, Minn.

[22] Filed: Aug. 11, 1975

[21] Appl. No.: 603,761

Related U.S. Application Data

[63] Continuation of Ser. No. 479,671, June 17, 1974, abandoned.

[52] U.S. Cl. .............................. 156/459; 156/530; 156/566
[51] Int. Cl.² ...................................... B31F 7/00
[58] Field of Search .......... 156/184, 189, 215, 218, 156/443, 446, 447, 456, 457, 458, 459, 510, 566, 530; 93/77 R, 81 R, 81 MT; 53/198 R, 218; 242/7.21, 7.22; 72/466

[56] References Cited
UNITED STATES PATENTS 1,511,715  10/1924  Beadle ........................ 93/81 R
3,765,980  10/1973  Hurlbut, Sr. et al. ............. 156/173
3,770,556  11/1973  Evans et al. ......................... 156/218
3,839,117  10/1974  Amberg et al. ..................... 156/456
3,873,018   3/1975  Donnay .............................. 156/187

Primary Examiner—Charles E. Van Horn
Assistant Examiner—Basil J. Lewris
Attorney, Agent, or Firm—Alexander, Sell, Steldt & DeLaHunt

[57] ABSTRACT

A device for forming lengths of adhesive tape into tubes including a mandrel having an axis and a multiplicity of radially outwardly projecting resilient bristles having tips defining at least the major portion of a periphery around the axis in the shape of a tube to be formed. The tape is wrapped around the periphery of the mandrel and the ends of the tape overlapped to form a tube having an axially extending seam. A ring is then pressed against one end of the formed tube to slide it axially off of the bristles and mandrel.

10 Claims, 10 Drawing Figures

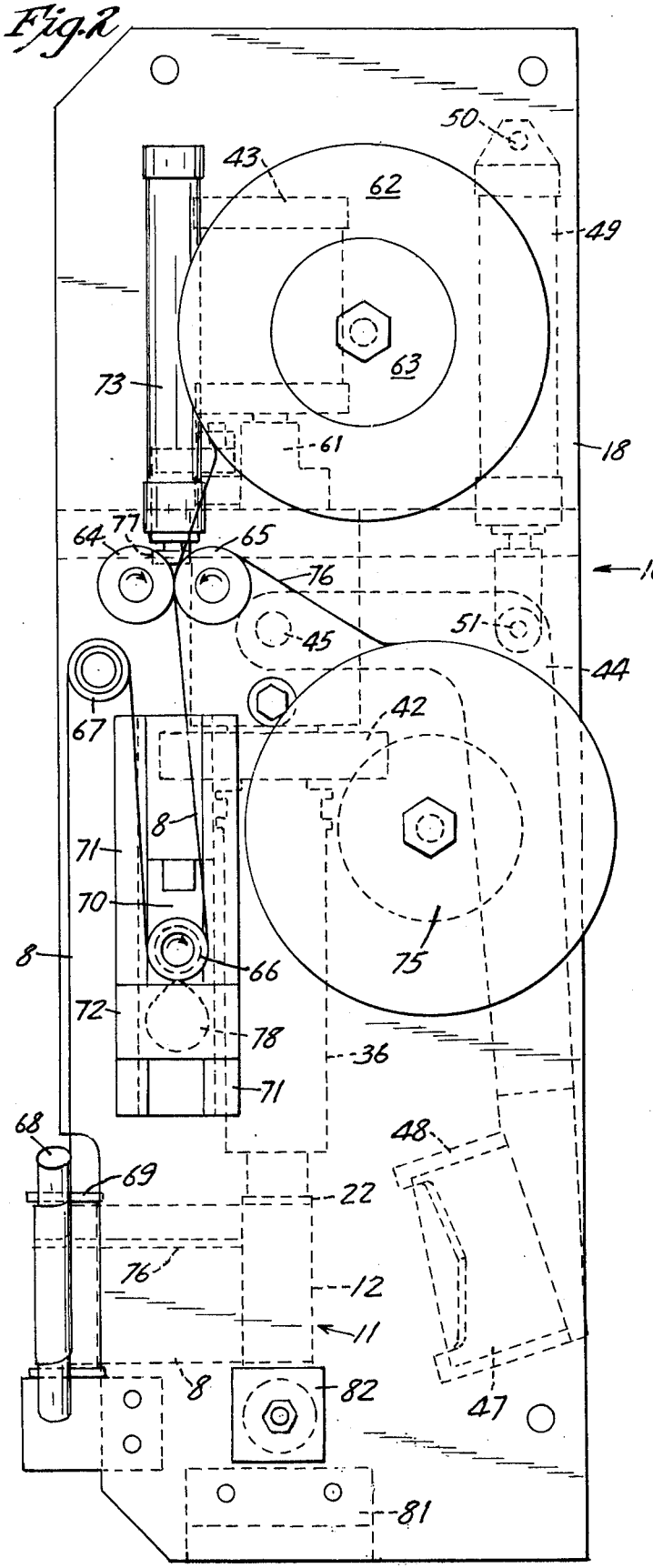
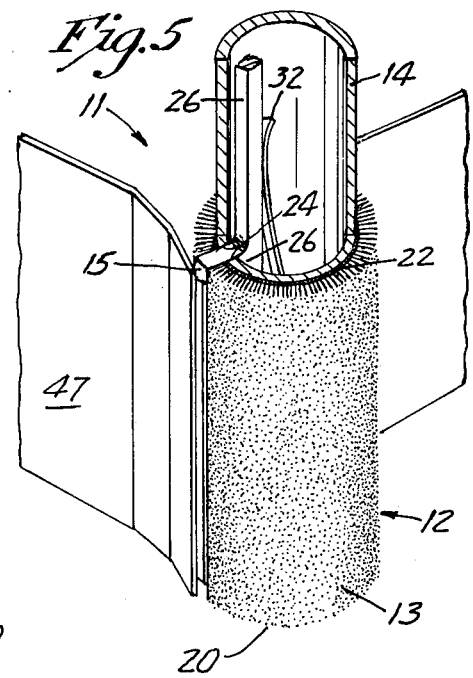
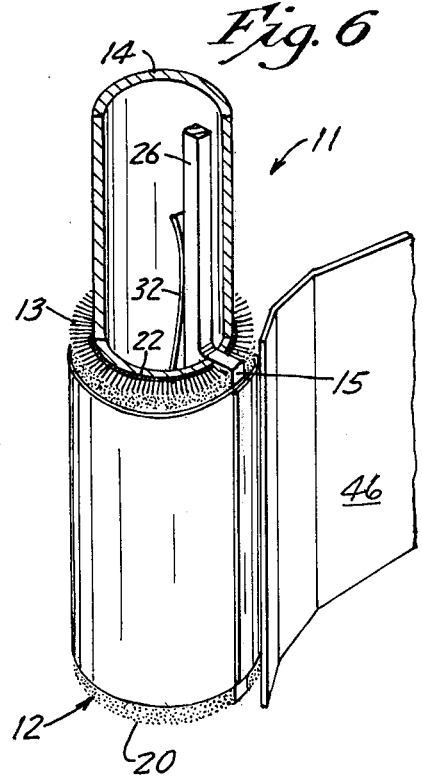

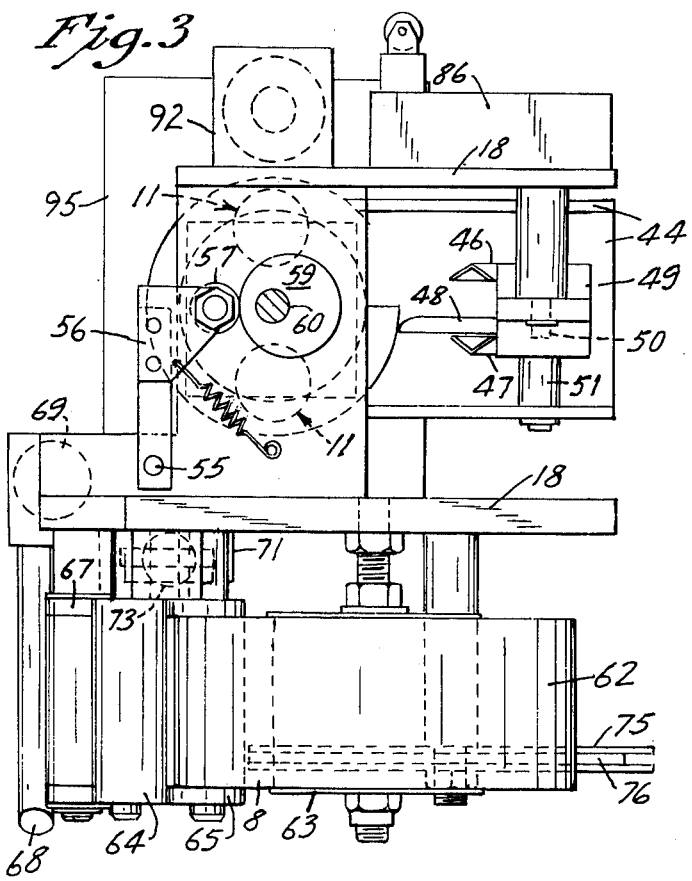
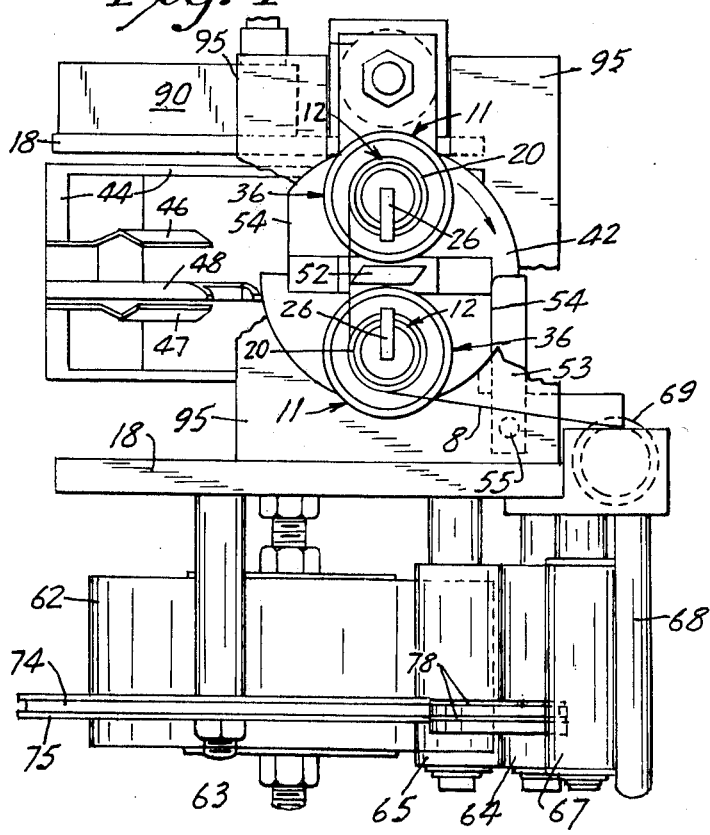
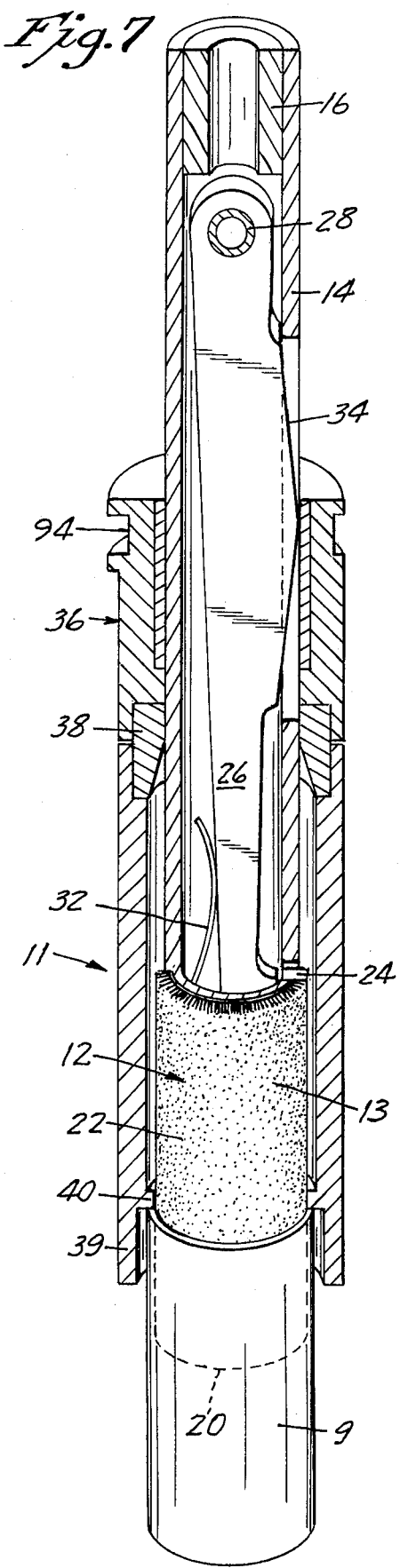

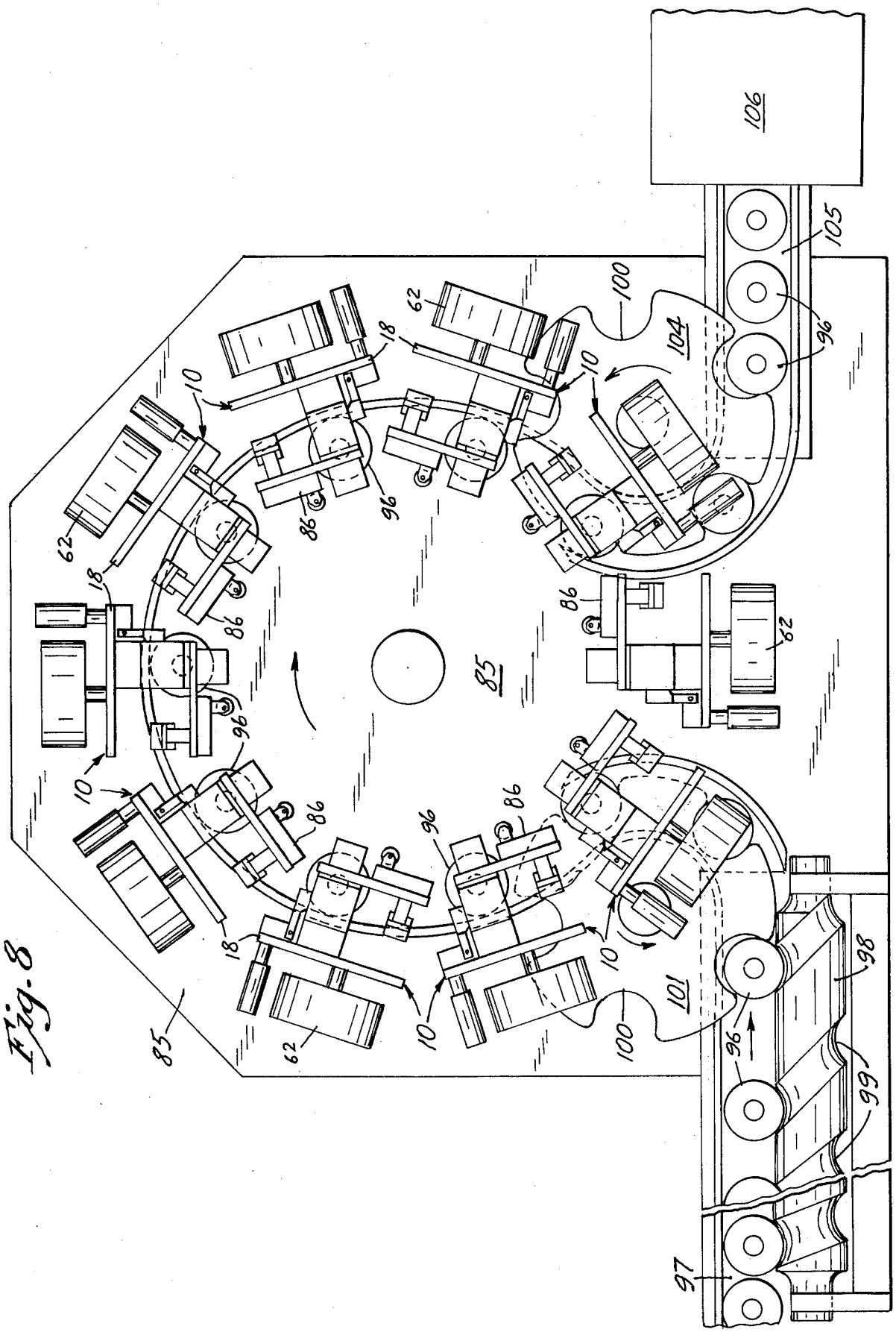

TUBE FORMING DEVICE

This is a continuation of application Ser. No. 479,671, filed June 17, 1974, now abandoned.

BACKGROUND OF THE INVENTION

This invention relates to devices for forming cylinders of a predetermined length and diameter, and in one aspect to devices for forming such cylinders from a heat shrinkable material and applying the cylinders in an unshrunk condition about objects such as the butted ends of two items or the closed ends of containers such as capped or corked bottle necks; which cylinders may subsequently be shrunk about the objects to form seals.

Heretofore many such seals applied around objects (such as the ends of capped or corked bottles containing alcoholic beverages) have consisted of seamless tubular lengths of heat shrinkable material. In a typical application, such a seamless tube of unshrunk heat shrinkable material is positioned around an object, and then heat shrunk to the contour of the object to provide a satisfactory, but expensive seal.

Heat shrinkable tapes have been used to provide a less expensive seal for certain types of objects by wrapping a length of the tape around each of the objects and subsequently applying heat to conform the tape thereto (see U.S. Pat. No. 3,873,018). The ends of the tape forming the axial seams in such seals must be smoothly overlapped and pressed firmly together prior to shrinking, however, for if they are not the seams will part and curl during the heat shrinking process, leaving unsightly or otherwise unsatisfactory seals. Thus heretofore tape could only be used around portions of objects having generally cylindrical surfaces which provided proper support for forming the seams and tape could not be reliably used to form seals around portions of objects having very irregular surfaces.

SUMMARY OF THE INVENTION

A device according to the present invention forms a length of pressure sensitive adhesive coated tape into a tube which has an overlapped seam running axially from end to end. The device is particularly useful in providing relatively inexpensive tubes of adhesive coated heat shrinkable tape which tubes have smooth, firmly joined seams. After they are formed, the tubes of heat shrinkable tape can be applied and shrunk around surfaces of objects which are very irregular in shape. The formed tube has pressure sensitive adhesive on its inner surface so that, unlike the aforementioned seamless tube, a tube formed of heat shrinkable tape can be tacked to the object to accurately locate the tube on the object before it is shrunk.

The device includes a mandrel having an axis, and a multiplicity of resilient flexible bristles projecting radially outwardly of the mandrel and defining with their tips at least the major portion of a periphery around the axis of the mandrel in the shape of a tube to be formed. A length of adhesive coated tape can be wrapped around the axis of the mandrel with the adhesive in contact with the bristle tips, and the ends of the tape overlapped to form a tube. The mandrel extends through an orifice in a stripping ring, which orifice is shaped like and slightly smaller than the cross sectional shape of the mandrel's periphery. The stripping ring can move axially along the mandrel, thus slightly deflecting the bristles and engaging the end of the formed tube to slide the tube axially from the mandrel.

The tube slides relatively easily on the bristles off the end of the mandrel. Apparently as the tube begins to move, each of the flexible bristles is deflected axially of the mandrel, thereby decreasing the cross sectional size of the surface defined by the bristle tips, and breaking the contact between each bristle tip and the pressure sensitive adhesive on the inner surface of the tube; and no significant adhesive contact is again established between the bristles and the moving tube.

In an embodiment of the device particularly adapted for use in forming lengths of adhesive coated heat shrinkable tape into tubes, the device is adapted to provide firm support on the mandrel along the area on which the seam is to be formed. This support is provided by a firm tacking surface on a support member mounted in an axial slot in the mandrel. The support member is mounted for movement from an attach position with the tacking surface aligned with the portion of the mandrel's periphery defined by the bristles, and a release position with the tacking surface retracted within the mandrel. With the tacking surface in the attach position a first end of a length of tape may be adhered to the tacking surface, the tape wrapped around the outer surface defined by the bristles, and a second end of the tape smoothly overlapped and firmly adhered on the first end of the tape over the tacking surface to form a tube. The device includes cam means for moving the support member to its release position upon movement of the stripping ring along the mandrel so that the support member will be separated from the tube, allowing the ring to slide the formed tube from the mandrel.

As illustrated herein, devices according to the present invention can conveniently be used to form a highly automated tube forming machine by using a pair of the devices mounted on a turrethead, together with means (bearing some resemblance to a device suggested in U.S. Pat. No. 2,643,016) for cutting predetermined lengths of tape from a supply, and applying the lengths around the mandrels. This machine also includes means for pre-stripping the tape supply and means for incorporating a tear strip in the seal in the manner disclosed in the aforementioned U.S. Pat. No. 3,873,018. The machine also positions and tacks the completed seal on a bottle thereby providing a complete tubular seal forming and positioning machine suitable for use with automated bottling equipment.

BRIEF DESCRIPTION OF THE DRAWING

The invention will be further described with reference to the accompanying drawing wherein like numbers refer to like parts in the several views, and wherein:

FIG. 2 is a right side elevational view of the machine of FIG. 1;

FIG. 3 is a sectional view taken approximately along line 3—3 of FIG. 1 and rotated 90° clockwise;

FIG. 4 is a sectional view taken approximately along line 4—4 of FIG. 1 and rotated 90° clockwise;

FIGS. 5, 6 and 7 are fragmentary perspective views partially in section of one of the tube forming devices of FIG. 1 sequentially illustrating the forming and removal of a tube thereon;

FIG. 8 schematically illustrates the use of a plurality of the machines of FIG. 1 in an automated bottling line.

DESCRIPTION OF THE PREFERRED EMBODIMENTS

Figure 1:
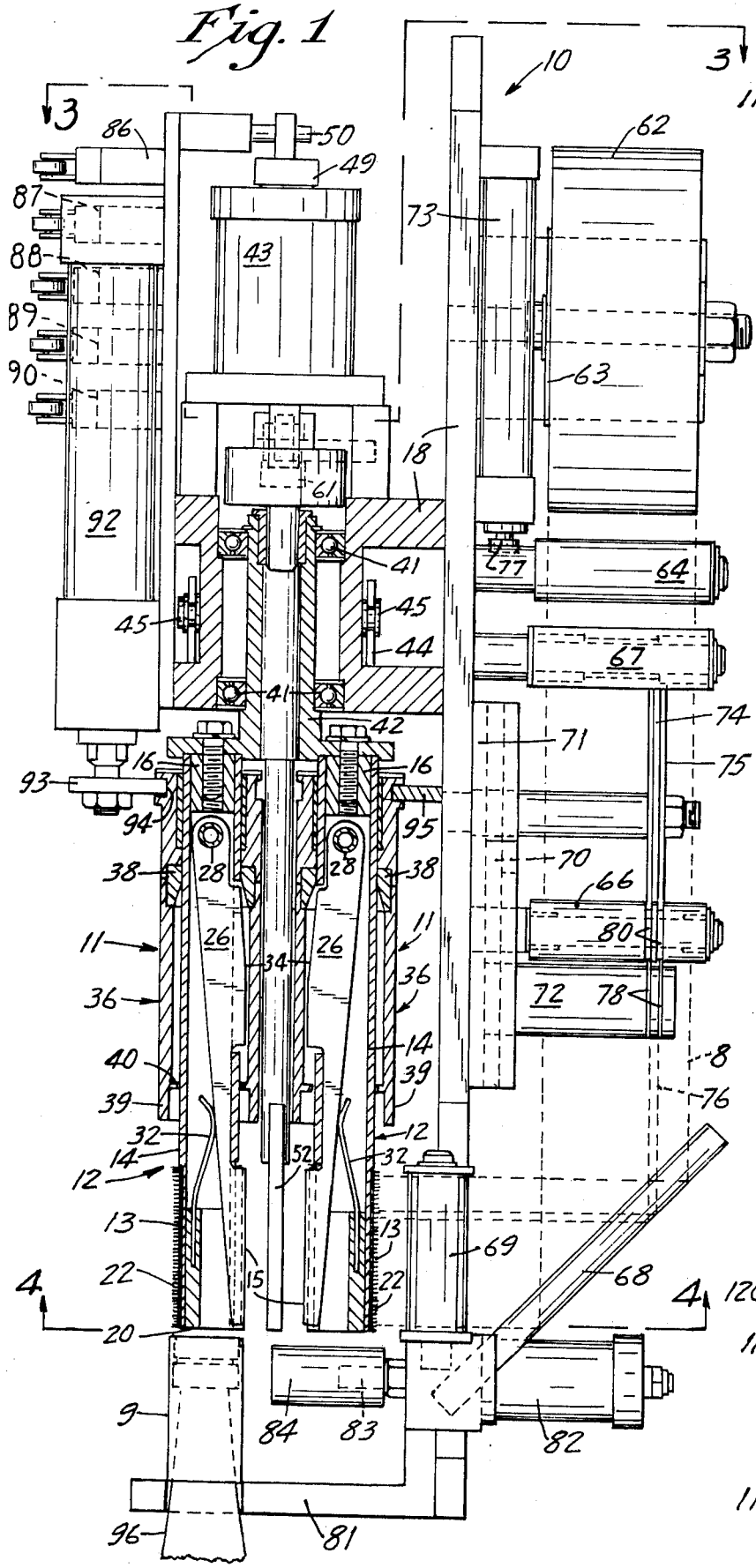
FIG. 1 is a front elevational view, partially in section, of a tube forming and applying machine including two tube forming devices according to a first embodiment of the present invention.

Referring now to FIGS. 1 through 7 of the drawing there is illustrated a machine 10 including a pair of devices 11 according to the present invention particularly adapted for forming lengths of pressure sensitive adhesive coated heat shrinkable tape 8 into tubes having firmly adhered overlapped seams extending axially from end to end.

The devices 11 each include a mandrel 12 having a major surface portion defined by the tips of bristles 13 around which a predetermined length of tape is wound with the adhesive coated surface contacting the bristle tips, and a surface portion providing a firm tacking surface 15 on which the ends of the length of tape are firmly overlapped to form a seam for the tube. The mandrels 12 also include means for retracting the tacking surface 15 from a formed tube, and for removing the formed tube from the mandrel 12.

As is best seen in FIG. 1 the mandrels 12 each include a hollow cylindrical rigid support member 14 having an end 16 supported by a frame 18 of the machine 10, and an unsupported end 20. A layer of brush-like material 22 comprising the short flexible, resilient bristles 13 embedded at one end in a stiff flexible resilient backing sheet is adhered around the rigid member 14 at its unsupported end 20, with the bristles 13 projecting radially outwardly therefrom.

A preferred brush-like material 22 is that designated VN-100 Vertically Oriented "Fibre-Tran" (trademark) material sold by Minnesota Mining and Manufacturing Company of St. Paul, Minn. which comprises 50 denier nylon bristles projecting about 0.15 inch normally from a flexible backing at a density of about 8,000 to 10,000 bristles per square inch of backing.

The tips of the bristles 13 define a peripheral surface portion about the axis of the mandrel 12 corresponding in size and shape to the inside diameter of a tube 9 to be formed. The mandrel 12 has an axially extending slot 24 (FIG. 5) through the rigid member 14. A bar-like seam support member 26 is pivotably mounted at a pin 28 within the rigid member 14, and has a first projecting edge portion adapted to enter the slot 24 which provides the firm tacking surface 15. The tacking surface 15 has a width which is approximately the same as the width of a seam to be formed on a tube 9 (e.g. about one-eighth inch wide), and extends the axial length of the brush-like material 22. A spring 32 biases the seam support member 26 to an attach position with the tacking surface 15 aligned with the peripheral surface portion defined by the tips of the bristles 13. In the attach position the tacking surface 15 provides a firm continuous support surface to which a first end of the tape 8 may be adhered while the tape 8 is wrapped around the mandrel 12, and over which a second end of the tape 8 may be firmly adhered over the first end to form a seamed tube 9.

The means for retracting the tacking surface 15 from a formed tube 9 and for removing a formed tube 9 from the mandrel 12 include cam means for separating the tacking surface 15 from the seam of the formed tube 9, and means for pushing the tube 9 (which after separation from the tacking surface 15 is supported only by the bristle 13 tips of the layer of brush-like material 22) axially off the unsupported end 20 of the mandrel 12 (see FIG. 7).

The pin 28 mounts the seam support member 26 for pivotal motion between the attach position and a release position within the rigid member 14 with the tacking surface 15 retracted from the peripheral surface portion defined by the tips of the bristles 13. The seam support member 26 also has a second projecting edge portion which defines a cam surface 34 and projects through a slot in the wall of the rigid member 14. The end of the cam surface 34 adjacent the pin 28 is about even with the outer surface of the rigid member 14 when the seam support member 26 is in its attach position, with the rest of the cam surface 34 projecting beyond the outer surface of the rigid member 14.

A pressed assembly forming a sleeve 36 includes spaced inwardly projecting rings 38 and 40, which guide the sleeve 36 for axial sliding movement along the rigid member 14 between a first position adjacent the attached end 16 of the rigid member 14 and an eject position adjacent the unsupported end 20 of the rigid member 14. The rings 38 and 40 are sized and positioned so that during movement of the sleeve 36 from its first toward its eject position, first the ring 38 (preferably of bronze and called a cam actuating ring 38 herein) will move onto the cam surface 34 and move the same support member 26 to its release position to separate the tacking surface 15 from the adhesive coated surface of a tube 9 on the mandrel 12, after which the ring 40 (preferably of hardened material and called an ejecting ring 40 herein) moves into contact with the adjacent end of the tube 9 supported on the tips of the bristles 13 and pushes the tube 9 from the mandrel 12. The opening in the ejecting ring 40 is slightly smaller than the surface defined by the ends of the bristles, so that the ejecting ring 40 will deflect the bristles over which is passes and come squarely into contact with the end of a tube 9 supported thereon, and a cylindrical sleeve portion 39 projecting from the ejecting ring 40 has an I.D. adapted to support the side walls of the tube to prevent buckling thereof as the tube 9 is pressed from the mandrel 12.

The device also includes means for automatically wrapping a predetermined length of the tape 8 around the mandrels 12 from a supply length of the tape 8 on the machine 10, including means for sequentially (1) adhering a first end of the tape 8 to the tacking surface 15 of one of the mandrels 12, (2) wrapping the tape 8 around said mandrel, and (3) severing the supply length of the tape 8 to provide a second end for the predetermined length of the tape 8 and for firmly adhering the second end on the first end of the tape 8 over the tacking surface 15 on said mandrel.

The mandrels 12 are mounted in axially parallel spaced relationship on a turrethead 42 rotatably mounted on the frame 18 via bearings 41 for rotation about an axis parallel to and spaced halfway between the axes of the mandrels 12. A rotary actuator 43 is coupled (via turrethead drive means later to be explained) to rotate the turrethead 42 in 180° steps so that upon each operation thereof, one of the mandrels 12 is revolved between a first mandrel position (as illustrated for the mandrel 12 on the right side of FIG.

1) and a second mandrel position (as illustrated for the mandrel 12 on the left side of FIG. 1). The mandrels 12 are fixed on the turrethead 42 with their tacking surfaces 15 opposed to each other on the adjacent surfaces of the mandrels 12, and centered on a plane through the axes of the mandrels 12. The supply length of the tape 8 is fed onto the mandrel 12 in the first position. Initially the end of the supply length of the tape 8 extends more than 90° around the periphery of the mandrel in the first position on the side toward which it will be moved to reach the second position, and is adhered to the tacking surface 15 on the mandrel 12 in the first position, which may be the result of hand threading the machine 10, or means for adhering the newly severed end of the supply length of the tape 8 which will later be explained. When the machine 10 is activated to produce a tube, the rotary actuator 43 is operated to rotate the turrethead 42 and revolve the mandrels 180°. As the mandrel 12 in the first mandrel position revolves to the second mandrel position, it rotates 180° so that when that mandrel reaches the second mandrel position the tape 8 is wrapped about 270° about its periphery, and extends tangentially between the peripheries of both the mandrels 12. The machine 10 includes a bifurcated arm 44 having spaced end parts pivotably mounted on the machine 10 at pins 45 and carrying at its opposite end a pair of spring steel pressure plates 46 and 47 spaced on opposite sides of a knife blade 48. An air cylinder 49 is pivotably mounted on the frame 18 at a pin 50, and a piston rod in the cylinder 49 is attached at a pin 51 to the arm 44. The cylinder 49 may be activated to pivot the arm 44 between a disengaged position with the pressure plates 46 and 47 and knife blade 48 spaced from the mandrels 12, to an engaged position with the pressure plates 46 and 47 between the mandrels 12, during which movement a V-shaped cutting edge on the knife blade 48 will make shearing engagement across an aligned cutting edge of a cantilevered bar 52 axially projecting from the turrethead 42, thereby severing the length of the tape 8 extending between the mandrels 12. Subsequently during such movement of the arm 49 from its disengaged to its engaged position an arcuate contact surface on the pressure plate 46 will move along the newly severed end of the predetermined length of the tape to wrap it the last 90° around the mandrel 12 in the second mandrel position and press it into engagement with its opposite end over the tacking surface 15 and an arcuate surface on the pressure plate 47 will move along the newly severed end on the supply length of the tape 8 to wrap it 90° around the mandrel 12 in the first mandrel position and press its end into engagement with the tacking surface 15 on that mandrel 12.

The drive means for indexing the turrethead 42 will now be explained. The rotary actuator 43 is of the type having a reciprocating vane, such as the actuator designated "Tork-Mor (trademark) Model No. SF-2-2" and sold by Roto Actuator Corp., St. Clair Shores, Mich. The actuator 43 in the normal condition applies a clockwise torque to the turrethead 42 as viewed in FIG. 4, with the position of the turrethead 42 being established by engagement of the end of a pawl 53 in one of an opposed pair of notches 54 on the turrethead 42. The pawl 53 is fixed at one end of a shaft 55 pivotably mounted on the frame 18 and having an arm 56 rotatably supporting a roller 57 fixed to its end opposite the pawl 53 (FIG. 3). A spring 58 biases the roller 57 against a cam 59 fixed to a drive shaft 60 connected to the vane in the actuator 43. The shaft 60 is coupled to the turrethead 42 through a one-way clutch 61 which provides driving engagement between the actuator 43 and turrethead 42 only in the clockwise direction as viewed in FIG. 4. When the actuator 43 is operated to advance the turrethead 42, the vane and shaft 60 are first rotated about 180° in a counterclockwise direction as viewed in FIG. 4. During this rotation the one-way clutch 61 slips so that the turrethead 42 does not move, and the cam 59 rotates to lift the pawl 53 from the notch 54 with which it was engaged. The vane then returns about 180° in a clockwise direction (FIG. 4) driving the turrethead 42 via the shaft 60 and one-way clutch 61. The cam 59 is shaped so that during such movement the pawl 53 is at first separated from the turrethead 42 but subsequently is allowed to rest against the turrethead 42 under the influence of the spring 58. When the pawl 53 engages the next notch 54, it stops movement of and positions the turrethead 42 180° from its starting position.

The tape supply means for the machine 10 includes means for pre-stripping the tape 8 from a supply roll 62 of the tape 8 removably mounted on a hub 63 rotatably supported on the frame 10. From the supply roll 62 the tape 8 extends along a path between a pair of nipping rollers 64 and 65 rotatably mounted on the frame 10 and around a pre-stripping roller 66. From the pre-stripping roller 66 the tape 8 extends around a clutched roller 67 mounted via a one-way clutch on the frame 18 to only allow movement of tape toward the mandrels 12, and around an inclined tape guide pin 68 which directs the tape 8 across a guide roller 69 and onto the mandrels 12. The guide roller 69 is axially parallel to the mandrels 12 and has end flanges which position the tape 8 axially along the mandrels 12. The pre-stripping roller 66 is rotatably mounted on a plate 70 which is slidably mounted in opposing slots defined by a spaced pair of rails 71 and the frame 18. The slidable plate 70 affords movement of the pre-stripping roller 66 between a retracted position adjacent the nipping rollers 64 and 65, and an extended position more distantly spaced from the nipping rollers 64 and 65 defined by engagement of the pre-stripping roller 66 against a support arm 72 fixedly and adjustably mounted on the rails 71. An air cylinder 73 has its piston rod 77 aligned to contact the adjacent edge of the plate 70. Between rotations of the turrethead 42 the air cylinder 73 is cycled to extend and then again retract its piston rod 77, thereby pushing the pre-stripping roller 66 from its retracted to its extended position. During such movement of the pre-stripping roller 66 the clutched roller 67 will not rotate, and the tape 8 will not slip on the periphery of the clutched roller 67 because of adhesive contact therewith, so that the tape 8 is stripped from the supply roll 62. Each stroke of the cylinder 73 to move the pre-stripping roller 66 from its retracted position to its extended position is adapted to strip an amount of tape which is slightly greater than the predetermined length to be wrapped around a mandrel 12 to form a tube 9. Movement of the tape around the mandrel 12 upon rotation of the turrethead 42 will pull the pre-stripping roller 62 from its extended toward its retracted position, with the weight of plate 70 providing the proper tape tension for wrapping the tape around the mandrel 12.

Means are also provided for adding a tear strip 76 to a tube 9 formed on the machine 10, and for notching the end of the tape 8 in the tube 9 on both sides of the tear strip 76 to afford access thereto after the tube 9 is heat shrunk onto a bottle; all in accordance with the teaching of U.S. Pat. No. 3,873,018, incorporated herein by reference.

A supply roll of tear strip material 74 is mounted on a flanged hub 75 rotatably mounted on the frame 18. The end of the tear strip material extends around the nipping roller 65 where it is pressed into contact with and adhered to the adhesive surface of the tape.

The support arm 72 mounted on the rails 71 supports adjacent its distal end a pair of spaced triangular shaped cutters 78. The points of the cutters 78 are positioned to enter spaced grooves 80 around the periphery of the roller 66 as that roller 66 is moved to its extended position, thereby notching the tape for a short distance on opposite sides of the tear strip 76 which is positioned on the tape between the grooves 80. The length of the tape 8 from the pre-stripping roller 62 in its extended position to the mandrels 12 can be adjusted by repositioning the support arm 72 along the rails 71 so that the notch on the predetermined length of the tape 8 on the mandrel 12 in the second mandrel position will intersect the second or overlapped end thereof.

The machine 10 includes means for (1) positioning a bottle 79 coaxially adjacent the unsupported end 20 of the mandrel 12 in the second mandrel position; (2) axially positioning an ejected tube 9 of the heat shrinkable tape 8 along the neck of a bottle 79 so positioned; and (3) tacking the tube 9 to the bottle 79. The frame 18 includes a shoe 81 formed with an open ended slot adapted to receive the neck of a bottle 79, and to position a bottle 79 at its inner end coaxially below the mandrel 12 in the second mandrel position. The surface of the shoe 81 adjacent the mandrel 12 is adapted to support the end of an ejected tube 8, thereby axially positioning it along the neck of a bottle 79 in the shoe 81. An air operated cylinder 82 is mounted on the frame 18 adjacent the unsupported end 20 of the mandrel 12 in the second mandrel position. A projecting end of the piston rod 83 in the cylinder 82 supports a soft rubber plug 84. The cylinder 82 is located so that the projecting end of the plug 84 will contact and press an ejected tube 8 on the shoe 81 against the neck of a bottle 79 which the tube 9 surrounds when the air cylinder 82 is activated to extend the piston rod 83. Such pressing causes the layer of pressure sensitive adhesive within the tube 9 to adhere to the bottle 79 and tacks the tube in a proper position on the bottle 79 prior to application of heat to shrink the tube 9.

The machine also includes control means for operating the machine 10 and adapted for activation as by spaced cams driven on a common shaft (not shown), or, if the frame 18 is mounted on a rotating table 85 as in a bottle line as illustrated in FIG. 8, by fixed projections 91 adjacent the table 85. The control means comprises five aligned spring return air valves, 86, 87, 88, 89 and 90. The valves 86, 88, 89 and 90 control air cylinders 82, 49, actuator 42, and air cylinder 73 respectively. The valve 87 controls an air cylinder 92 mounted axially parallel with the mandrels 12, which cylinder 92 is attached via a separable coupling to the sleeve 36 on the mandrel positioned in the second mandrel position, and is operable to move that sleeve 36 between its first and second positions. The separable coupling includes a plate 93 attached at the projecting end of the piston rod in the cylinder 92 and adapted to enter and make driving contact axially in a circular groove 94 around either of the sleeves 36 when that sleeve 36 is revolved into the second mandrel position. The sleeve 36 on the mandrel 12 in the first mandrel position is maintained in its first mandrel position by a plate 95 attached to the frame 18 which projects into the groove 94 around that mandrel 12.

The sequential operation of the machine 10 will now be described in conjunction with the operation of the valves 86, 87, 88, 89 and 90. Initially, with none of the valves activated, the valve 86 maintains the piston 83 in the air cylinder 82 supporting the tacking plug 84 in the retracted position, the valve 90 maintains the piston 77 in the air cylinder 73 in the retracted position, and the pre-stripping roller 66 is in its extended position, the valve 88 maintains the piston in the cylinder 49 in its retracted position to position the arm 44 in its disengaged position, the valve 89 causes the turrethead 42 to remain stationary, and the valve 87 maintains the piston in the cylinder 92 in its retracted position so that the sleeve 36 on the mandrel 12 in the second mandrel position is in its first position.

The machine 10 is operated to form a tube by first operating the valve 89 so that the actuator 43 rotates the turrethead 42 180°. This rotation changes the positions of the mandrels 12 thereby wrapping the tape 8 around the mandrel 12 moved to the second mandrel position. Such wrapping of the tape 8 pulls the pre-stripping roller 62 to its retracted position. Next the valve 88 controlling the cylinder 49 is actuated to move the arm 44 to its engaged position and return it to its disengaged position, thereby (1) causing scissors-like engagement of edges of the knife blade 48 and bar 52 to sever the predetermined length of the tape 8 from the supply length of the tape 8; (2) causing the pressure plate 47 to tack the second end of the predetermined length of the tape 8 over its first end on the tacking surface 30 of the mandrel 12 in the second mandrel position to complete a tube 9 on that mandrel; and (3) causing the pressure plate 46 to press the newly severed end on the supply length of the tape 8 onto the tacking surface 15 on the mandrel 12 in the first mandrel position. Next the valve 87 controlling the air cylinder 92 is operated to move the sleeve 36 toward the unsupported end 20 of the mandrel 12 and return it to its first position. This retracts the tacking surface 15 via the cam surface 34 and ring 38, and slides the completed tube 9 from the unsupported end 20 of the mandrel 12 to position it around the neck of a bottle 79, supported by the shoe 81. After the sleeve 36 completes its travel to the unsupported end 20 of the mandrel 12, the valve 86 operating the cylinder 82 supporting the plug 84 is actuated to press the plug 84 against the tube 9 on the neck of a bottle 79.

At some time during the sequential operation of the cylinders 92 and 82, the valve 90 operating the air cylinder 73 is cycled to push the pre-stripping roller 66 to its extended position and strip tape from the supply roll 62. This movement also applies the tear strip material from the supply roll 74 to the tape at the roller 65, and slits the tape 8 along opposite sides of the tear strip material as the cutters 78 move into the grooves 80 on the pre-stripping roller 66, which provides a tab for access to the tear strip 76 on the applied tube 9, as has previously been explained.

The heat shrinkable tape 8 used in the machine 10 can be made from a variety of materials, such as polyethylene terephthalate (see U.S. Pat. Nos. 3,631,899 and 3,718,495) or polyvinyl chloride. Also a variety of pressure sensitive adhesives are useful for coating the tape 8, such as acrylate pressure-sensitive adhesives taught in U.S. Pat. No. Re. 24,906, or rubber-resin pressure-sensitive adhesives. The tear strip 76 may also be made from a variety of materials; one especially useful material being a form of polyethylene terephthalate.

The machine 10 is particularly adapted for use with automatic bottling equipment in a manner such as that illustrated in FIG. 8. As illustrated in FIG. 8, bottles 96 are fed by an infeed conveyor 97 to a timing screw 98 driven at a predetermined rate. The timing screw 98 has a helical groove 99 with a pitch that increases from the end adjacent the infeed conveyor 97 so that the bottles are moved against a fixed guide rail and properly spaced to be accepted by notches 100 in a properly timed star wheel 101. The star wheel 101 positions the bottles 96 in the shoes 81 of machines 10 mounted on and spaced about the periphery of the rotating table 85. As each of the machines 10 rotates with the table 85 it is actuated by the stationary projections 91 fixed at the center of the table 85 in the operational sequence previously described to form and apply a tube 9 about a bottle 96 in its shoe 81 as that machine 10 is revolved between the star wheel 101 and a similar star wheel 104. The star wheel 104 is timed to remove the bottle 96 from the machine 10 and position it on an outfeed conveyor 105. The outfeed conveyor 105 carries the bottles 96 with the applied tube 9 tacked in place through a heat shrink tunnel 106 in which turbulent hot air shrinks the tube 9 to provide a sealed bottle 96.

Figure 9:
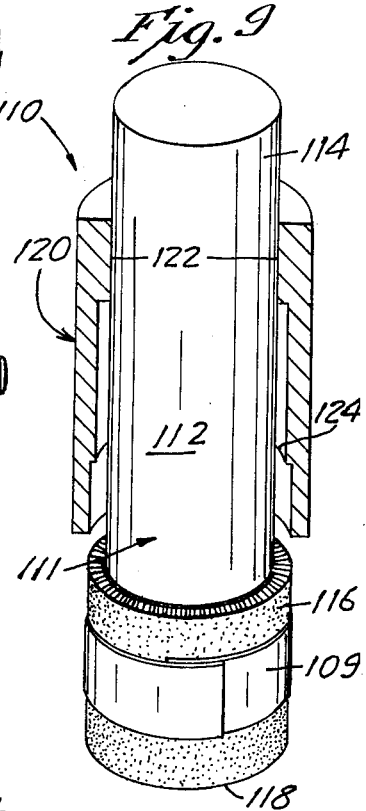
FIGS. 9 and 10 are perspective views, partially in section of a tube forming device according to a second embodiment of the present invention, which also sequentially illustrate the forming and removal of a tube.
Figure 10:
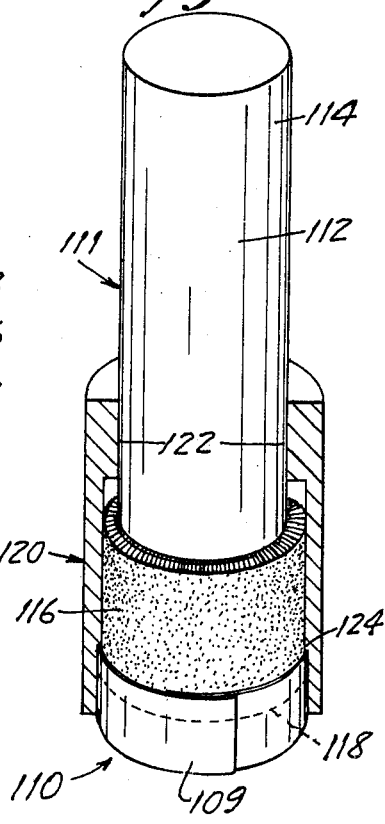

While an embodiment of the present invention has been explained which is particularly adapted for forming tubes of heat shrinkable tape having a coating of pressure-sensitive adhesive which are subsequently to be shrunk about a bottle, it should be understood that the inventive concept described herein could also be applied to forming tubes from lengths of tape coated with pressure-sensitive adhesives which form a sufficient bond for the intended use of the tube (e.g. decoration) upon wrapping the tape and overlapping its ends about a periphery defined entirely by the tips of resilient bristles. Such a manual operated device 110 for forming tubes 109 of tape is illustrated in FIGS. 9 and 10.

The device 110 includes a mandrel 111 comprising a rigid cylindrical support member 112 having a first end 114 which serves as a handle for manually supporting the device 110. A layer of brush-like material 116 comprising short flexible, resilient bristles each embedded at one end in a stiff flexible resilient backing sheet is adhered around the support member 112 adjacent its second end opposite the first end 114, with the bristles projecting radially outwardly of the support member 112. The tips of the bristles define a cylindrical surface around the axis of the support member 112 which correspond in size and shape to the inside diameter of a tube 109 to be formed.

A sleeve 120 is slidably mounted for axial movement along the support member 112 via a bearing surface 122 from a first position adjacent the first end 114 of the support member 112 toward its second end 118. The end of the sleeve 120 adjacent the second end 118 of the support member 112 has an inwardly projecting ring 124 having a central opening which corresponds in shape to and is slightly smaller than the surface defined by the ends of the bristles. As the sleeve is moved toward the second end 118 of the support member 102, it will deflect the bristles over which it passes and come squarely into contact with the adjacent end of a tube 109 supported thereon to push it from the second end of the support member 112.

To form a length of tape into a tube 109 on the device 110, an operator first wraps the length around the surface defined by the tips of the bristles and overlaps the ends of the tape to form the tube 109 (FIG. 8). Next the operator slides the sleeve 120 toward the second end 118 of the support member 112 so that the ring 124 will press the completed tube 109 along the bristles and off the end of the mandrel 111.

Experience has shown that most types of adhesive coated tape can be formed into tubes using either the device 11 or the device 110, the main requirement for the tape used being that it has sufficient edge thickness as a result of the material and thickness of the tape backing, that the tube will not buckle as it is pressed from the bristles. Thus while the device 11 is particularly adapted for forming tubes of heat shrinkable tape, it, like the device 110 can also be used to form tubes from other adhesive coated tapes (such as paper or metal foil tapes) and may be preferred if a firmly bonded seam is required.

I claim:

1. A device for forming a predetermined length of adhesive coated tape having opposite first and second ends into a tube, said device comprising:

a mandrel comprising a support member having an axis and a multiplicity of flexible resilient bristles, each of said bristles attached at one end to said support member and projecting radially outwardly therefrom and the outer tips of said bristles defining a peripheral surface around said axis in the shape and size of a said tube to be formed so that a said length of tape may be wrapped around the peripheral surface and its first and second ends overlapped to form a tape tube with a seam running axially from end to end; and means mounted for movement axially along the support member and adapted to engage an end of a said tube formed around said peripheral surface and to move the tube axially off the mandrel, said means also deflecting said bristles and breaking the contact between the tips of the bristles and the pressure sensitive adhesive on the inner surface of the tube.

2. A device for forming a predetermined length of adhesive coated tape having opposite first and second ends into a tube, said device comprising:

a mandrel comprising a support member having an axis and a multiplicity of flexible resilient bristles, each bristle being attached at one end to said support member and projecting radially outwardly therefrom with the outer tips of said bristles defining a peripheral surface around said axis in the shape and size of a said tube to be formed; and a stripping ring having an orifice in the shape of and slightly smaller than the cross sectional shape of the periphery defined by the bristles, said stripping ring being mounted around said mandrel for axial movement thereon so that a said length of tape may be wrapped around the peripheral surface and its first and second ends overlapped to form a tape tube with a seam running from end to end, and the stripping ring subsequently moved axially along the mandrel to slide the formed tube from an end of the mandrel.

3. A device according to claim 1, wherein said bristles are of nylon, are each about 0.003 inch in diameter, have unsupported lengths projecting about 0.15 inch to their tips which define said peripheral surface, and have a population density of about 8,000 to 10,000 bristles per square inch.

4. A device for forming a predetermined length of adhesive coated tape having opposite first and second ends into a tube having an axially extending overlap seam, said device comprising:

a mandrel including a main support member having an axis, first and second ends, a multiplicity of flexible resilient bristles each attached at one end to said main support member and projecting radially outwardly therefrom, the outer tips of said bristles defining a peripheral surface around said axis in the shape and size of a said tube to be formed, said main support member having an axially extending slot communicating with said peripheral surface; and a seam support member having a firm tacking surface of about the size of a said seam to be formed mounted for movement relative to said main support member from an attach position in said slot with said tacking surface aligned with said peripheral surface, and a release position with said tacking surface retracted from said peripheral surface witin said slot so that with said support member in said attach position the first end of said length of tape may be adhered to said tacking surface, the tape wrapped around the peripheral surface, and the second end of the tape smoothly overlapped on the first end over the tacking surface to form a tube having an overlapped seam extending from end to end;

means mounted for movement axially along the support member from its first end toward its second end adapted for engaging an end of a said tube formed around said peripheral surface; and means for positioning said seam support member in said attach position when said means mounted for movement is at the first end of said main support member and for moving said seam support member to said release position to separate the seam support member from a said formed tube upon movement of said means mounted for movement toward the second end of said main support member and prior to engagement thereof with the formed tube, subsequent movement of said means mounted for movement to said second end being adapted to move said formed tube off the second end of said mandrel, said means mounted for movement also deflecting said bristles and breaking the contact between the tips of the bristles and the pressure sensitive adhesive on the inner surface of the tube.

5. A device for forming a predetermined length of adhesive coated tape having opposite first and second ends into a tube, said device comprising:

a mandrel including a main support member having an axis, first and second ends, a multiplicity of flexible resilient bristles each attached at one end to said main support member and projecting radially outwardly therefrom, the outer tips of said bristles defining a peripheral surface around said axis in the shape and size of a said tube to be formed, said main support member having an axially extending slot communicating with said peripheral surface; and a seam support member having a firm tacking surface mounted for movement relative to said main support member from an attach position in said slot with said tacking surface aligned with said peripheral surface, and a release position with said tacking surface retracted from said peripheral surface within said slot;

a stripping ring having an orifice in the shape of and slightly smaller than the cross sectional shape of the periphery defined by the bristles, said stripping ring being mounted around said mandrel for axial movement from the first end toward the second end of the main support member; and means for positioning said seam support member in said attach position when said stripping ring is at the first end of said main support member and for moving said seam support member to said release position upon movement of said stripping ring toward the second end of said main support member;

whereby with said stripping ring at the first end of said main support member the first end of said length of tape may be adhered to said tacking surface, the tape wrapped around the peripheral surface, and the second end of the tape smoothly overlapped on the first end over the tacking surface to form a tube having an overlapped seam extending from end to end, and upon subsequent movement of the stripping ring toward the second end of said main support member the seam support member will be separated from the formed tube and the tube pressed from the mandrel by the stripping ring.

6. A device according to claim 5, wherein said bristles are of nylon, are each about 0.003 inch in diameter, have unsupported lengths projecting about 0.15 inch to their tips which define said peripheral surface, and have a population density of about 8,000 to 10,000 bristles per square inch.

7. The device of claim 5, further including tape applying means for adhering the first end of a said length of tape to said tacking surface, for wrapping the length of tape around the mandrel, and for adhering the second end of said length of tape on the first end thereof over said tacking surface.

8. The device of claim 7, wherein said device is further adapted to cut said predetermined length of tape from a supply length of tape on the device, and further includes severing means adapted to sever said predetermined length of tape from said supply length during adhesion of its second end to its first end by said tape applying means.

9. A device according to claim 8, wherein said mandrel is mounted to revolve about an axis parallel the axis of said mandrel.

10. A machine for forming predetermined lengths of a supply length of adhesive coated tape into a tube, said machine comprising:

a frame;

a turret mounted on said frame for rotation about an axis;

a first mandrel and a second mandrel mounted on said turret, each of said mandrels comprising:

a main support member having an axis, first and second ends, a multiplicity of flexible resilient bristles each attached at one end to said main support member and projecting radially outwardly therefrom, the outer tips of said bristles defining a peripheral surface around said axis in the shape and size of a said tube to be formed, said main support member having an axially extending slot communicating with said peripheral surface;

a seam support member having a firm tacking surface mounted on said support member for movement relative thereto between an attach position in said slot with said tacking surface aligned with said peripheral surface, and a release position with said tacking surface retracted from said peripheral surface within said slot;

a stripping ring having an orifice in the shape of and slightly smaller than the cross sectional shape of the periphery defined by the bristles, said stripping ring being mounted around said mandrel for axial movement from the first end toward the second end of the main support member; and means for positioning said seam support member in said attach position when said stripping ring is at the first end of said main support member and for moving said seam support member to said release position upon movement of said stripping ring toward the second end of said main support member;

the first end of each of said mandrels being mounted on said turret with the axes of said mandrels parallel to and equally spaced from the axis of the turret and being in a common plate with the axis of the turret, said mandrels projecting in the same direction with their second ends aligned and the portions of the support members defining the axially extending slots in the mandrels being opposed and adjacent to each other on opposite sides of the axis for said turret;

means for defining rotational positions for said turret at 180° intervals to define first and second positions for each of said mandrels;

means for defining a path for said tape supply to feed tape to the mandrel in said first position at a contact line spaced at least 90° from said slot around the periphery of said mandrel; and means for severing a length of tape extending tangentially between the peripheries of said mandrels and for pressing each newly severed end into engagement over the tacking surface on the support member of the adjacent mandrel.

* * * * *

Disclaimer 4,014,734.—*Richard A. Patterson*, Village of Woodbury, Washington County, Minn. TUBE FORMING DEVICE. Patent dated Mar. 29, 1977. Disclaimer filed Apr. 4, 1977, by the inventor, the assignee, *Minnesota Mining and Manufacturing Company*, assenting.

The term of this patent subesquent to Mar. 22, 1994, has been disclaimed.

[*Official Gazette August 2, 1977.*]